United States Patent
Mulligan et al.

(10) Patent No.: US 11,816,748 B2
(45) Date of Patent: *Nov. 14, 2023

(54) CONTEXTUAL COMPARISON OF SEMANTICS IN CONDITIONS OF DIFFERENT POLICIES

(71) Applicant: International Business Machines Corporation, Armonk, NY (US)

(72) Inventors: Natalia Mulligan, Dublin (IE); Joao H Bettencourt-Silva, Dublin (IE); Marco Luca Sbodio, Dublin (IE); Vanessa Lopez Garcia, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,702

(22) Filed: Jan. 26, 2023

(65) Prior Publication Data
US 2023/0177627 A1    Jun. 8, 2023

Related U.S. Application Data

(63) Continuation of application No. 17/123,804, filed on Dec. 16, 2020, now Pat. No. 11,615,493.

(51) Int. Cl.
*G06Q 50/18*    (2012.01)
*G06N 20/20*    (2019.01)
(Continued)

(52) U.S. Cl.
CPC ............. *G06Q 50/18* (2013.01); *G06N 20/00* (2019.01); *G06Q 40/08* (2013.01)

(58) Field of Classification Search
CPC ......... G06Q 50/18; G06Q 40/08; G06N 20/00
(Continued)

(56) References Cited

U.S. PATENT DOCUMENTS

| 6,455,979 B2 | 9/2002 | Reindl et al. |
| 8,020,191 B2 | 9/2011 | Bertino et al. |

(Continued)

OTHER PUBLICATIONS

Oltramari et al., "PrivOnto: A Semantic Framework for the Analysis of Privacy Policies", Semantic Web, 20 pages.
(Continued)

*Primary Examiner* — Robert R Niquette
(74) *Attorney, Agent, or Firm* — Amin, Turocy & Watson, LLP

(57) ABSTRACT

Systems, computer-implemented methods, and computer program products to facilitate contextual comparison of semantics in conditions of different policies are provided. According to an embodiment, a system can comprise a processor that executes computer executable components stored in memory. The computer executable components can comprise a comparison component that contextually compares semantics of conditions in policy data of different policies based on a feature of at least one entity. The computer executable components further comprise a contextualization component that employs a model to provide a contextual explanation of how a first condition in first policy data of a first policy is semantically different from a second condition in second policy data of a second policy based on the feature of the at least one entity.

20 Claims, 10 Drawing Sheets

(51) Int. Cl.
  *G06Q 40/08* (2012.01)
  *G06N 20/00* (2019.01)
(58) Field of Classification Search
  USPC .............................................................. 705/4
  See application file for complete search history.

(56) References Cited

U.S. PATENT DOCUMENTS

| | | | |
|---|---|---|---|
| 8,587,613 | B2 | 11/2013 | Wang et al. |
| 8,650,250 | B2 | 2/2014 | Yamuna et al. |
| 8,689,281 | B2 | 4/2014 | Balinsky et al. |
| 8,719,063 | B1 * | 5/2014 | Wade ................. G06Q 40/08 705/4 |
| 10,009,377 | B2 | 6/2018 | Kamijoh et al. |
| 10,521,747 | B2 | 12/2019 | Warner et al. |
| 10,685,312 | B2 | 6/2020 | B'Far et al. |
| 2012/0029951 | A1 * | 2/2012 | Baluta .................. G06Q 40/02 705/4 |
| 2017/0364532 | A1 | 12/2017 | Mahadevan et al. |
| 2019/0373021 | A1 | 12/2019 | Parthasarathy et al. |
| 2020/0004742 | A1 | 1/2020 | Nagarajan et al. |
| 2020/0084105 | A1 | 3/2020 | Hajost et al. |
| 2020/0125659 | A1 | 4/2020 | Brisimi et al. |
| 2020/0136888 | A1 | 4/2020 | Jangam et al. |
| 2022/0188949 | A1 * | 6/2022 | Mulligan ............. G06Q 40/08 |

OTHER PUBLICATIONS

Breaux et al., "Analyzing Goal Semantics for Rights, Permissions, and Obligations", IEEE International Conference on Requirements Engineering, 2005, 10 pages.

Shvartzshnaider et al., "Analyzing Privacy Policies Using Contextual Integrity Annotations", Sciendo, arXiv:1809.02236v1 [cs.CY], 2018, 18 pages.

Kayes et al., "Out of the Wild: On Generating Default Policies in Social Ecosystems", IEEE International Conference on Communications Workshops, 2013, 5 pages.

Rahmouni et al., "Semantic Generation of Clouds Privacy Policies", International Conference on Cloud Computing and Services Science, 2014, 16 pages.

The Health Insurance Authority, "Health Insurance Comparison Tool", https://www.hia.ie/comparison/tool/#/, last accessed Dec. 9, 2020, 1 page.

Mell, Peter, et al., "The NIST Definition of Cloud Computing", National Institute of Standards and Technology, Sep. 2011, 7 pages.

Non Final Office Action recieved for U.S. Appl. No. 17/123,804 dated Nov. 12, 2021, 47 pages.

Final Office Action recieved for U.S. Appl. No. 17/123,804 dated Mar. 1, 2022, 30 pages.

Office Action received for G.B. Patent Application Serial No. 2117263.0 dated Jun. 6, 2022, 6 pages.

Non-Final Office Action received for U.S. Appl. No. 17/123,804 dated Jul. 15, 2022, 24 pages.

Office Action received for G.B. Patent Application Serial No. 2117263.0 dated Jul. 22, 2022, 3 pages.

Notice of Allowance received for U.S. Appl. No. 17/123,804 dated Oct. 26, 2022, 27 pages.

List of IBM Patents or Applications Treated as Related

U.S. Appl. No. 17/123,804, filed Dec. 16, 2020.

Notice of Allowance received for U.S. Appl. No. 17/123,804 dated Feb. 10, 2023, 5 pages.

Response filed on Feb. 7, 2023 for Office Action of G.B. Patent Application Serial No. 2117263.0 Mail received dated Jul. 22, 2022, 2 pages.

GB Office Action dated Mar. 8, 2023 for GB Application No. 2117263.0.

* cited by examiner

CONTEXTUAL COMPARISON OF SEMANTICS IN CONDITIONS OF DIFFERENT POLICIES

BACKGROUND

The subject disclosure relates to comparison of conditions in different policies, and more specifically, to contextual comparison of semantics in conditions of different policies.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate contextual comparison of semantics in conditions of different policies are described.

According to an embodiment, a system can comprise a processor that executes computer executable components stored in memory. The computer executable components can comprise a comparison component that contextually compares semantics of conditions in policy data of different policies based on a feature of at least one entity. The computer executable components further comprise a contextualization component that employs a model to provide a contextual explanation of how a first condition in first policy data of a first policy is semantically different from a second condition in second policy data of a second policy based on the feature of the at least one entity.

According to another embodiment, a computer-implemented method can comprise comparing, by a system operatively coupled to a processor, contextually, semantics of conditions in policy data of different policies based on a feature of at least one entity. The computer-implemented method can further comprise employing, by the system, a model to provide a contextual explanation of how a first condition in first policy data of a first policy is semantically different from a second condition in second policy data of a second policy based on the feature of the at least one entity.

According to another embodiment, a computer program product comprising a computer readable storage medium having program instructions embodied therewith, the program instructions executable by a processor to cause the processor to compare, contextually, semantics of conditions in policy data of different policies based on a feature of at least one entity. The program instructions are further executable by the processor to cause the processor to employ a model to provide a contextual explanation of how a first condition in first policy data of a first policy is semantically different from a second condition in second policy data of a second policy based on the feature of the at least one entity.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As referenced herein, an "entity" can comprise a human, a client, a user, a computing device, a software application, an agent, a machine learning (ML) model, an artificial intelligence (AI) model, and/or another entity. As referenced herein, a "policy" can comprise textual documents describing principles to guide decisions and achieve outcomes, where such principles can be described in the form of conditions or rules. Examples of policies include, but are not limited to, car insurance policies, home insurance policies, private health policies, public and/or state health policies, financial compliance regulations, and/or another policy. It will be understood that when an element is referred to herein as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling.

It should be appreciated from the description below that the various embodiments of the subject disclosure enable contextual comparison of semantically similar conditions in different policies and/or explanation of the differences between the semantically similar conditions. For example, it should be appreciated from the description below that the various embodiments of the subject disclosure enable contextual comparison of different policies within a given context, where such context can be defined by one or more features of a certain entity and/or a certain cohort.

Figure 1:
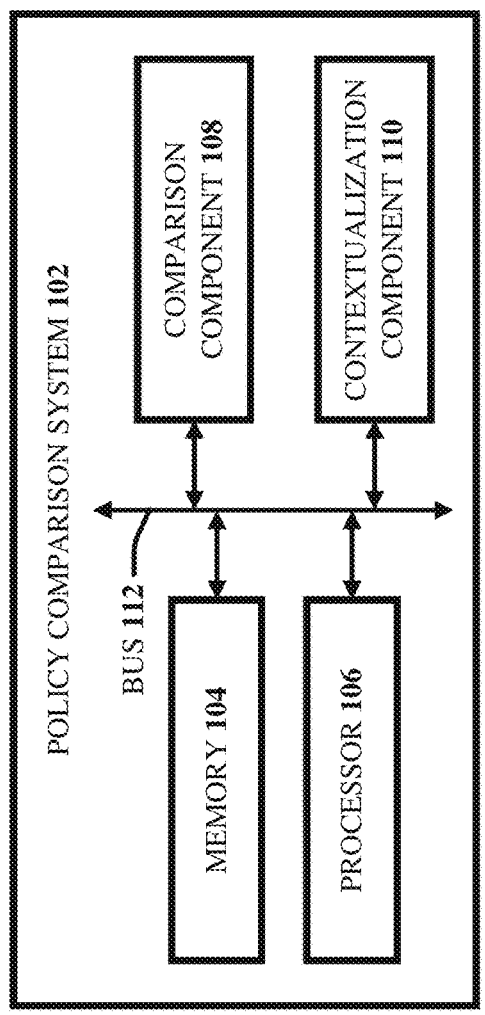
FIGS. 1, 2, 3, 4, and 5 illustrate block diagrams of example, non-limiting systems that can facilitate contextual comparison of semantics in conditions of different policies in accordance with one or more embodiments described herein.
Figure 2:
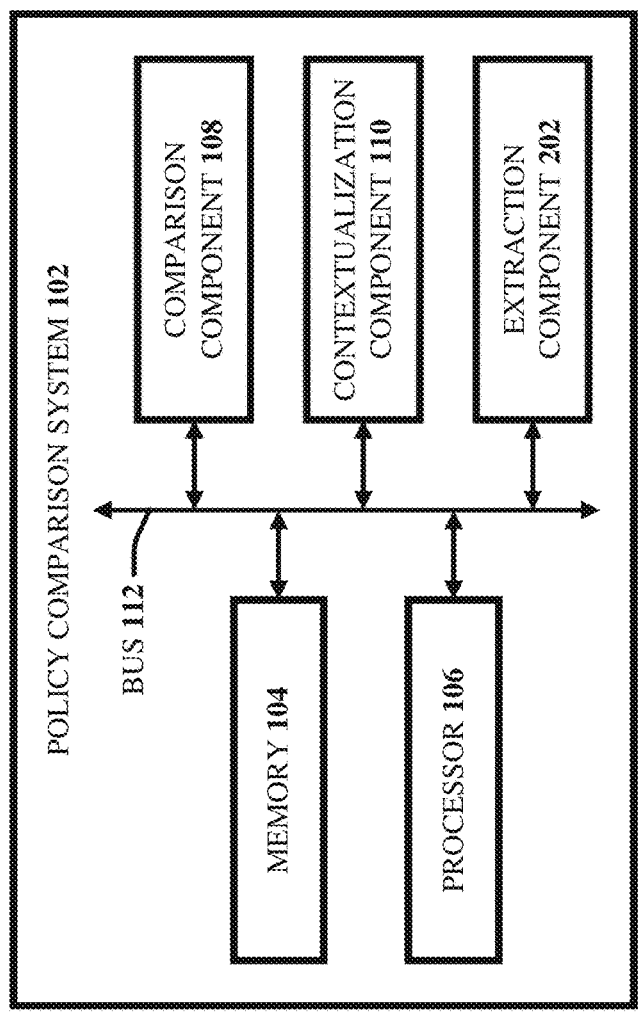
Figure 3:
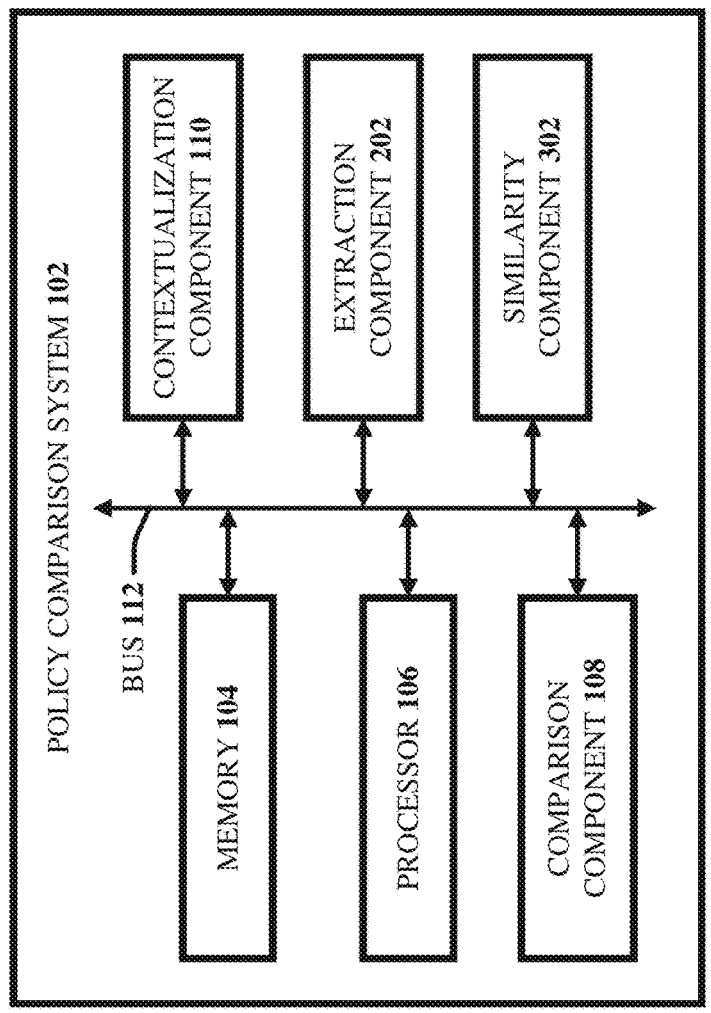

FIGS. 1, 2, and 3 illustrate block diagrams of example, non-limiting systems 100, 200, and 300, respectively, that can each facilitate contextual comparison of semantics in conditions of different policies in accordance with one or more embodiments described herein. System 100, 200, and 300 can each comprise a policy comparison system 102.

Policy comparison system 102 of system 100 depicted in FIG. 1 can comprise a memory 104, a processor 106, a comparison component 108, a contextualization component 110, and/or a bus 112. Policy comparison system 102 of system 200 depicted in FIG. 2 can further comprise an extraction component 202. Policy comparison system 102 of system 300 depicted in FIG. 3 can further comprise a similarity component 302.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, system 200, system 300, and/or policy comparison system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1, FIG. 2, FIG. 3, and/or other figures disclosed herein.

Memory 104 can store one or more computer and/or machine readable, writable, and/or executable components and/or instructions that, when executed by processor 106 (e.g., a classical processor, a quantum processor, and/or another type of processor), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to policy comparison system 102, comparison component 108, contextualization component 110, extraction component 202, similarity component 302, and/or another component associated with policy comparison system 102 as described herein with or without reference to the various figures of the subject disclosure.

Memory 104 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Policy comparison system 102, memory 104, processor 106, comparison component 108, contextualization component 110, extraction component 202, similarity component 302, and/or another component of policy comparison system 102 as described herein can be communicatively, electrically, operatively, and/or optically coupled to one another via bus 112 to perform functions of system 100, system 200, system 300, policy comparison system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Policy comparison system 102 can comprise any type of component, machine, device, facility, apparatus, and/or instrument that comprises a processor and/or can be capable of effective and/or operative communication with a wired and/or wireless network. All such embodiments are envisioned. For example, policy comparison system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Policy comparison system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, policy comparison system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, policy comparison system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet) or a local area network (LAN). Policy comparison system 102 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, policy comparison system 102 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between policy comparison system 102 and external systems, sources, and/or devices (e.g., computing devices, communication devices, and/or another type of external system, source, and/or device).

Policy comparison system 102 can comprise one or more computer and/or machine readable, writable, and/or executable components and/or instructions that, when executed by processor 106 (e.g., a classical processor, a quantum processor, and/or another type of processor), can facilitate performance of operations defined by such component(s) and/or instruction(s). Further, in numerous embodiments, any component associated with policy comparison system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, comparison component 108, contextualization component 110, extraction component 202, similarity component 302, and/or any other components associated with policy comparison system 102 as disclosed herein (e.g., communicatively, electronically, operatively, and/or optically coupled with and/or employed by policy comparison system 102), can comprise such computer and/or machine readable, writable, and/or executable component(s) and/or instruction(s). Consequently, according to numerous embodiments, policy comparison system 102 and/or any components associated therewith as disclosed herein, can employ processor 106 to execute such computer and/or machine readable, writable, and/or executable component(s) and/or instruction(s) to facilitate performance of one or more operations described herein with reference to policy comparison system 102 and/or any such components associated therewith.

Policy comparison system 102 can facilitate (e.g., via processor 106) performance of operations executed by and/or associated with comparison component 108, contextualization component 110, extraction component 202, similarity component 302, and/or another component associated with policy comparison system 102 as disclosed herein. For example, as described in detail below, policy comparison system 102 can facilitate (e.g., via processor 106): comparing, contextually, semantics of conditions in policy data of different policies based on a feature of at least one entity; and/or employing a model to provide a contextual explanation of how a first condition in first policy data of a first policy is semantically different from a second condition in second policy data of a second policy based on the feature of the at least one entity.

In the above example, as described in detail below, policy comparison system 102 can further facilitate (e.g., via processor 106): extracting first data from the first policy data and second data from the second policy data, where the first data and second data correspond to the feature of the at least one entity; identifying first data in the first policy data that has a first semantic similarity score within a defined range of a second semantic similarity score of second data in the second policy data, where the first semantic similarity score and the second semantic similarity score are calculated based on the feature of the at least one entity; comparing, contextually, the semantics of the conditions in the policy data based on domain knowledge corresponding to the first policy data or the second policy data, first data in the first policy data that has a first semantic similarity score within a defined range of a second semantic similarity score of second data in the second policy data, and/or the first data extracted from the first policy data and the second data extracted from the second policy data; employing the model to provide the contextual explanation of how the first condition in the first policy data is semantically different from the second condition in the second policy data based on contextual data corresponding to the at least one entity and to reduce workload and/or execution time of the model and/or the processor in comparing the first policy data and the second policy data; employing the model to provide one or more first conditions in the first policy data that are semantically different from one or more second conditions in the second policy data based on the feature of the at least one entity; and/or employing the model to rank first conditions in the first policy data that are semantically different from second conditions in the second policy data based on relevance to the feature of the at least one entity and/or the at least one entity.

Comparison component 108 can contextually compare semantics of conditions in policy data of different policies based on a feature of at least one entity. For example, comparison component 108 can contextually compare semantics of conditions (e.g., eligibility criteria) in first policy data of a first policy against those in second policy data of a second policy based on a feature (e.g., a characteristic and/or an attribute) of an entity as defined herein (e.g., a target entity) and/or a feature of a cohort (e.g., a target cohort comprising a group of entities having at least one common characteristic and/or attribute). In various embodiments of the subject disclosure, each of such a first and/or second policy can include, but is not limited to, an insurance policy, a government policy (e.g., a federal policy, a state policy, and/or another government policy), a company policy, an organization policy, a program policy, a service provider policy (e.g., a payer-provider policy), a policy in the domain of social services, and/or another type of policy. In various embodiments of the subject disclosure, each of such first and/or second policy data can include, but is not limited to, a section, a paragraph, a sentence, a table, a chart, a graph, a glossary, an appendix, and/or other policy data.

In multiple embodiments described herein, comparison component 108 can employ one or more machine learning (ML) and/or artificial intelligence (AI) models and/or techniques to contextually compare semantics of conditions (e.g., eligibility criteria) in first policy data of a first policy against those in second policy data of a second policy. For example, to contextually compare semantics of conditions (e.g., eligibility criteria) in first policy data of a first policy against those in second policy data of a second policy, comparison component 108 can employ one or more ML and/or AI models and/or techniques including, but not limited to, a sequence model (e.g., a sequence of words model), a neural network (e.g., a convolutional neural network (CNN), a recurrent neural network (RNN), and/or variations of CNN and/or RNN), an n-gram model, a classification model, a support vector machine (SVM), a logistic regression model, natural language processing (NLP), deep learning, and/or another ML and/or AI model and/or technique.

To contextually compare semantics of conditions in policy data based on a feature of at least one entity, comparison component 108 can identify similarities and/or differences between similar policy data of different policies (e.g., similar policy sections, paragraphs, sentences, and/or other similar policy data). In an embodiment, comparison component 108 can compare the rules of semantically similar conditions in a first policy against those in a second policy and can further express the differences (e.g., in a computer readable format, a human readable format, and/or in another type of format). For example, comparison component 108 can use a knowledge graph comparisons technique to identify similarities and differences between condition rules in first policy data of a first policy and second policy data of a second policy. In another example, comparison component 108 can semantically compare rules extracted from first policy data (e.g., text in a paragraph) of a first policy against rules extracted from second policy data (e.g., text in a paragraph) of a second policy to identify similarities and differences between condition rules in the first policy and the second policy. In this example, such rules can be extracted from the first and/or second policy data by extraction component 202 as described below.

In some embodiments, comparison component 108 can contextually compare the semantics of conditions in first policy data of a first policy against those in second policy data of a second policy based on, for instance, domain knowledge. To contextually compare the semantics of conditions in first policy data of a first policy against those in second policy data of a second policy based on domain knowledge, comparison component 108 can employ one or more of the above defined ML and/or AI models and/or techniques. In various embodiments of the subject disclosure, such domain knowledge can correspond to the first policy data, the second policy data, the first policy, and/or the second policy. In these embodiments, such domain knowledge can include, but is not limited to, ontologies (e.g., ontology information providing defined ontologies used in the domain), knowledge bases (e.g., knowledge graph information defining one or more knowledge graphs used in the domain), terminologies (e.g., dictionary and/or term information defining terms and associated definitions used in the domain), cost of services covered by policies, census data, taxonomies, data models defining relationships between data objects associated with the domain, tables, business rules schemas, and/or other domain knowledge. For example, with respect to the healthcare industry, the domain knowledge can include information defining procedure codes, medical terms, information relating data objects associated with specific medical services to one another, and/or other domain knowledge in the healthcare industry.

In some embodiments, comparison component 108 can contextually compare the semantics of conditions in first policy data of a first policy against those in second policy data of a second policy based on, for instance, first data in the first policy data that has a first semantic similarity score within a defined range of a second semantic similarity score of second data in the second policy data. To contextually compare the semantics of conditions in first policy data of a first policy against those in second policy data of a second policy based first data in the first policy data that has a first semantic similarity score within a defined range of a second semantic similarity score of second data in the second policy data, comparison component 108 can employ one or more of the above defined ML and/or AI models and/or techniques. In various embodiments of the subject disclosure, such first and/or second data can include, but is not limited to, structured data, unstructured data, textual data, alphanumeric data, token data, character data, object data, graph data, rule data, table data, and/or other data.

In some embodiments, comparison component 108 can contextually compare the semantics of conditions in first policy data of a first policy against those in second policy data of a second policy based on, for instance, the first data extracted from the first policy data and the second data extracted from the second policy data. To contextually compare the semantics of conditions in first policy data of a first policy against those in second policy data of a second policy based on the first data extracted from the first policy data and the second data extracted from the second policy data, comparison component 108 can employ one or more of the above defined ML and/or AI models and/or techniques.

Contextualization component 110 can employ a model to provide a contextual explanation of how a first condition (e.g., a first eligibility criterion) in first policy data (e.g., a section and/or a paragraph) of a first policy is semantically different from a second condition in second policy data of a second policy based on a feature (e.g., a characteristic and/or an attribute) of at least one entity (e.g., a single entity and/or a cohort). To provide such a contextual explanation, contextualization component 110 can employ a model to provide one or more first conditions in first policy data of a first policy that are semantically different from one or more second conditions in second policy data of a second policy based on a feature of at least one entity (e.g., a single entity and/or a cohort). For example, to provide one or more first conditions in the first policy data that are semantically different from one or more second conditions in the second policy data based on the feature of the at least one entity, contextualization component 110 can determine which feature(s) of the at least one entity (e.g., a single entity and/or a cohort) and/or which condition(s) in the first and/or second policy data of the first and/or second policies are relevant to the at least one entity. To determine such feature(s) and/or condition(s), contextualization component 110 can use one or more preferences of the at least one entity (e.g., preference(s) of a single entity and/or a cohort). In some embodiments, an entity as defined herein can define such preferences (e.g., relevant feature(s) and/or condition(s)) using, for instance, an interface component (not illustrated in the figures) of policy comparison system 102 (e.g., a graphical user interface (GUI), an application programming interface (API), a representational state transfer (REST) API, and/or another type of interface).

In some embodiments, contextualization component 110 can implement a preference learning process to infer such preferences (e.g., relevant feature(s) and/or condition(s)) corresponding to the at least one entity (e.g., to a single entity and/or a cohort). In these embodiments, contextualization component 110 can implement such a preference learning process to infer such preferences using, for instance, a recommender system (e.g., a recommender model such as, for example, a regression model and/or a classification model). In these embodiments, such a recommender system can be trained to learn the preferences of the at least one entity (e.g., to learn relevant feature(s) and/or condition(s) corresponding to a single entity and/or a cohort) using historical usage pattern data corresponding to the at least one entity. For example, such a recommender system can be trained to learn such preferences of the at least one entity using historical usage pattern data including, but not limited to, historical operational data (e.g., policy provider claims), historical policy holder data, historical policy record data, contextual data (e.g., entity profile data, activities of daily living (ADL) data, census data, and/or other contextual data), and/or other historical usage pattern data corresponding to the at least one entity (e.g., to a single entity and/or a cohort).

In some embodiments, to determine such preferences of the at least one entity and/or to provide the above described contextual explanation, contextualization component 110 can employ an ML and/or AI model and/or technique (e.g., a neural network, a recommender system, an explanatory model, a predictive model, a classifier, and/or another ML and/or AI model and/or technique). In another example, contextualization component 110 can employ one or more preference inference models and/or techniques to determine such preferences of the at least one entity and/or to provide such a contextual explanation. For instance, contextualization component 110 can employ one or more preference inference models and/or techniques including, but not limited to, a lexicographic model, a Pareto chart, and/or another preference inference model and/or technique that can be used to determine such preferences of the at least one entity and/or to provide such a contextual explanation described above.

Contextualization component 110 can employ a model to provide a contextual explanation of how a first condition in first policy data of a first policy is semantically different from a second condition in second policy data of a second policy based on contextual data corresponding to the at least one entity (e.g., a single entity and/or a cohort). For example, contextualization component 110 can employ one or more of the above defined models and/or techniques (e.g., a preference inference model and/or technique, a lexicographic model, a Pareto chart, a neural network, a recommender system, an explanatory model, a predictive model, a classifier, and/or another model and/or technique) to determine which contextual data is relevant to the at least one entity and/or to provide such a contextual explanation based on the contextual data. In various embodiments of the subject disclosure, such contextual data can include, but is not limited to: operational data (e.g., policy provider claims); statistical data (e.g., census data and/or other statistical data describing the population of, for instance, a city, a town, a state, or a country); entity profile data; entity preferences data; ADL data, and/or another type of contextual data related to the at least one entity (e.g., a single entity and/or a cohort).

Contextualization component 110 can employ a model to rank first conditions in first policy data of a first policy that are semantically different from second conditions in second policy data of a second policy based on relevance to a feature (e.g., a characteristic and/or an attribute) of at least one entity (e.g., a target entity and/or a target cohort) and/or the at least one entity. For example, to rank first conditions in the first policy data that are semantically different from second conditions in the second policy data based on relevance to a feature (e.g., a characteristic and/or an attribute) of at least one entity (e.g., a single entity and/or a cohort) and/or the at least one entity, contextualization component 110 can employ one or more of the above defined models and/or techniques (e.g., a preference inference model and/or technique, a lexicographic model, a Pareto chart, a neural network, a recommender system, an explanatory model, a predictive model, a classifier, and/or another model and/or technique). For instance, contextualization component 110 can implement a preference learning process to infer and further rank first conditions in the first policy data that are semantically different from second conditions in the second policy data based on relevance to a feature (e.g., a characteristic and/or an attribute) of at least one entity (e.g., a target entity and/or a target cohort) and/or the at least one entity. In this example, contextualization component 110 can implement a preference learning process using, for instance, a recommender system (e.g., a recommender model such as, for example, a regression model and/or a classification model) to rank first conditions in the first policy data that are semantically different from second conditions in the second policy data based on relevance to a feature (e.g., a characteristic and/or an attribute) of at least one entity (e.g., a single entity and/or a cohort) and/or the at least one entity. In this example, such a recommender system can be trained to learn such first conditions in the first policy data (e.g., to learn conditions in the policy data that are relevant to the at least one entity) using historical usage pattern data corresponding to the at least one entity as described above.

From the description above, it should be appreciated that contextualization component 110 can extract relevant context data (e.g., the set of condition-values (e.g., conditions) that are relevant for a target entity and/or a target cohort) based on the above described contextual data and/or domain knowledge to identify and further rank relevant and/or focused areas of a target entity and/or target cohort. The relevant context that contextualization component 110 can extract can include, but is not limited to, services, different eligibility criteria across services, eligibility criteria most relevant to a target entity and/or a target cohort, and/or other relevant context data.

It should be further appreciated from the above description that, in some embodiments, contextualization component 110 can employ one or more preference inference models and/or techniques such as, for instance, a lexicographic model and/or a Pareto chart to infer and/or rank preferences (e.g., relevant feature(s) and/or condition(s)) of an entity and/or a cohort. In these embodiments, contextualization component 110 can determine usage patterns of an entity and/or a cohort using, for instance: operational data (e.g., policy provider claims) corresponding to a certain entity and/or cohort; historical data (e.g., policy holders and/or policy records database); contextual data (e.g., entity profile data, ADL data, census, and/or other contextual data); and/or any combination thereof. For example, services for an aged cohort are not relevant to a younger cohort (e.g., population in the state) and differences in eligibility criteria for services not present in operational data are not relevant.

It should be further appreciated from the above description that, in some embodiments, contextualization component 110 can apply the contextual data (e.g., the most relevant contextual data) to one or more policy sections, which can be identified by extraction component 202 and/or similarity component 302 as described below, to support the identification of the relevant sections and/or paragraphs in different policies and can further rank the differences in these policy sections by relevancy to an entity and/or a cohort based on contextual data. It should be further appreciated from the above description that, in some embodiments, contextualization component 110 can augment and/or enrich data in a policy section (e.g., data that can be extracted by extraction component 202 as described below) with relevant (e.g., preferred) contextual data (e.g., by calculating cost of a certain service for a certain entity and/or cohort). In these embodiments, as described above, relevant contextual data can be both explicitly defined by an entity that implements policy comparison system 102 and/or inferred by contextualization component 110 using historical usage pattern data (e.g., historical policy holder data, historical policy records data, historical operational data, historical contextual data, combinations thereof, and/or other available historical data sources). It should be further appreciated from the above description that, in some embodiments, contextualization component 110 can present (e.g., via a GUI, an API, a REST API and/or another interface component of policy comparison system 102) a ranked list with enriched evidence (e.g., supporting details and/or data) and/or explanations that can be generated by policy comparison system 102. It should be further appreciated from the above description that by contextually comparing semantics of conditions in policy data of different policies based on a feature of an entity and/or a cohort and further providing a contextual explanation of how the conditions in the policies are semantically different based on such a feature, policy comparison system 102 can thereby reduce a workload (e.g., a processing workload) and/or execution time of a model and/or a processor employed to compare the first policy data and/or the first policy to the second policy data and/or the second policy, respectively.

Extraction component 202 can extract first data from first policy data in a first policy and second data from second policy data in a second policy, where the first data and second data correspond to a feature (e.g., a characteristic and/or an attribute) of at least one entity (e.g., a target entity and/or a target cohort). As described above, in various embodiments of the subject disclosure, such first and/or second data can include, but is not limited to, structured data, unstructured data, textual data, alphanumeric data, token data, character data, object data, graph data, rule data, table data, and/or other data.

To extract such first data and/or such second data, extraction component 202 can employ one or more models (e.g., an ML and/or AI model) and/or techniques including, but not limited to: natural language processing (NLP), deep NLP parsing (e.g., using one or more neural networks), portable document format (PDF) parsing, text passage classifiers, entity extraction, supervised frequent pattern learning, unsupervised frequent pattern learning, semantic filtering, and/or another technique. In some embodiments, extraction component 202 can employ different information extraction techniques and/or different combinations of information techniques to extract such first data and/or second data. In this regard, the extracted first data and/or second data can reflect usage of different extraction techniques and/or different extraction technique combinations, which can have varying strengths and weaknesses depending on the type of data being extracted (e.g., unstructured data, structured data, and/or another type of data).

In some embodiments, extraction component 202 can extract semantic knowledge from the above referenced first data and/or second data and can further generate a formal representation such as, for instance, structured data. For example, extraction component 202 can employ one or more of the above defined models and/or techniques to extract unstructured data from one or more sections of different policies and can further structure the unstructured data by generating semantic annotations, knowledge graphs, and/or rules that provide structure to the unstructured data.

In some embodiments, extraction component 202 can employ domain knowledge to facilitate extracting first data from first policy data in a first policy and/or second data from second policy data in a second policy. For example, extraction component 202 can employ domain knowledge to extract one or more structured representations of a policy condition and/or a policy rule included in a first policy and/or a second policy. In some embodiments, such domain knowledge can correspond to the first data, the second data, the first policy data, the second policy data, the first policy, and/or the second policy. In these embodiments, such domain knowledge can include, but is not limited to, ontologies (e.g., ontology information providing defined ontologies used in the domain), knowledge bases (e.g., knowledge graph information defining one or more knowledge graphs used in the domain), terminologies (e.g., dictionary and/or term information defining terms and associated definitions used in the domain), cost of services covered by policies, census data, taxonomies, data models defining relationships between data objects associated with the domain, tables, business rules schemas, and/or other domain knowledge. For example, with respect to the healthcare industry, the domain knowledge can include information defining procedure codes, medical terms, information relating data objects associated with specific medical services to one another, and/or other domain knowledge in the healthcare industry.

Similarity component 302 can identify first data in first policy data of a first policy that has a first semantic similarity score within a defined range of a second semantic similarity score of second data in second policy data of a second policy, where the first semantic similarity score and the second semantic similarity score are calculated based on a feature (e.g., a characteristic and/or an attribute) of at least one entity (e.g., a target entity and/or a target cohort). For example, similarity component 302 can identify a characteristic of a target entity and/or a target cohort in a section (e.g., a paragraph) of a first policy that has a first semantic similarity score within a defined range of a second semantic similarity score of the characteristic of the target entity and/or target cohort in a section (e.g., a paragraph) of a second policy, where the first semantic similarity score and the second semantic similarity score are calculated based on the characteristic. To perform this identification operation, similarity component 302 can employ one or more semantic similarity models and/or techniques including, but not limited to, topic modelling, Jaccard similarity, and/or another sematic similarity model and/or technique that can be used to identify semantically similar data with respect to a certain feature of an entity and/or a cohort.

In some embodiments, similarity component 302 can identify data in a first policy (e.g., paragraphs, sections, and/or other data) that is missing in a second policy. In these embodiments, similarity component 302 can employ an anomaly detection (e.g., outlier detection) model and/or technique to identify such data that is present in a first policy and missing in a second policy.

Figure 4:
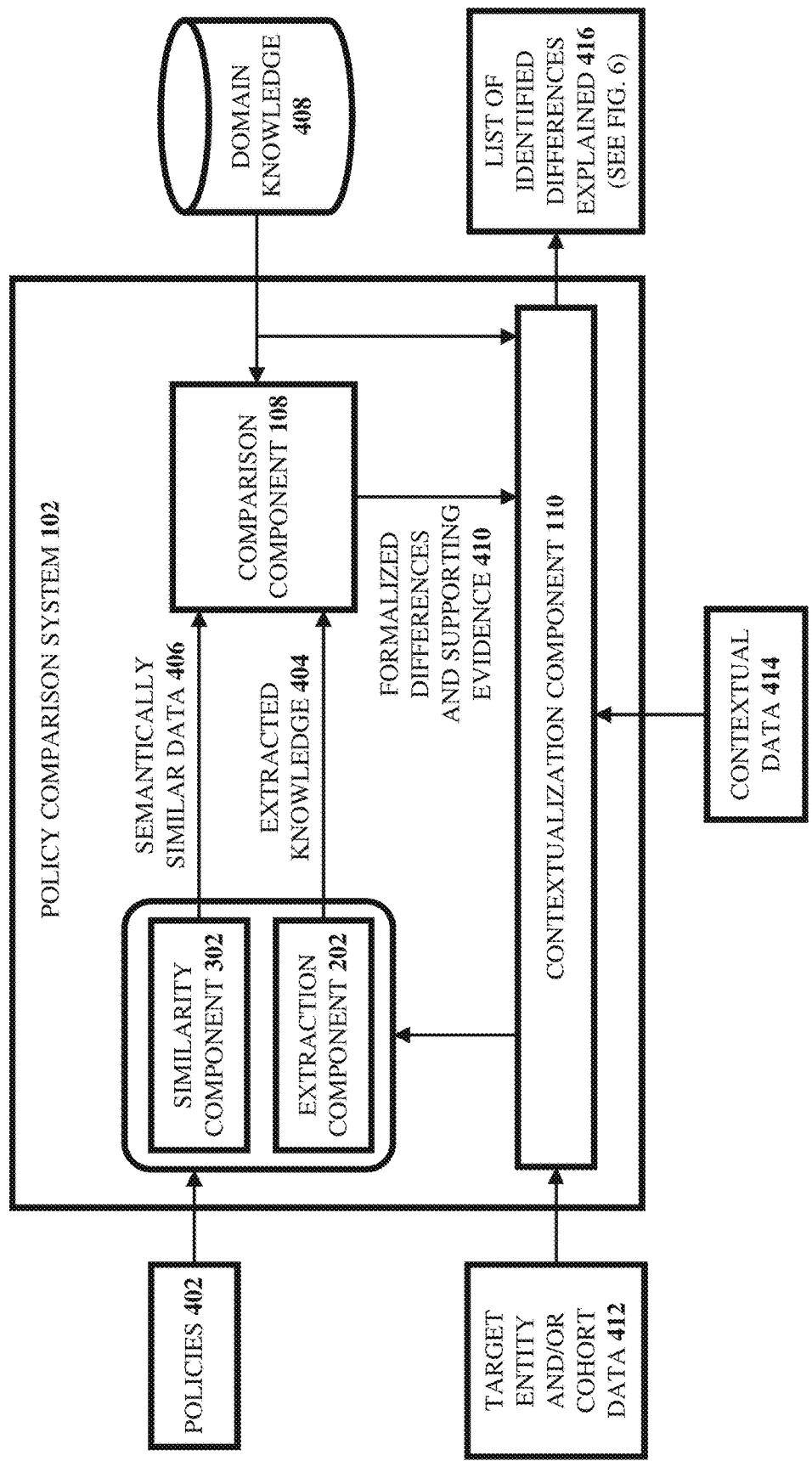

FIG. 4 illustrates a block diagram of an example, non-limiting system 400 that can facilitate contextual comparison of semantics in conditions of different policies in accordance with one or more embodiments described herein. Repetitive description of like elements and/or processes employed in respective embodiments is omitted for sake of brevity.

As illustrated in the example embodiment depicted in FIG. 4, extraction component 202 and similarity component 302 can receive policies 402 (e.g., via a GUI, an API, a REST API, and/or another interface component of policy comparison system 102). Policies 402 can include, but are not limited to, an insurance policy, a government policy (e.g., a federal policy, a state policy, and/or another government policy), a company policy, an organization policy, a program policy, a service provider policy (e.g., a payer-provider policy), a policy in the domain of social services, and/or another type of policy.

In the example embodiment illustrated in FIG. 4, extraction component 202 can extract extracted knowledge 404 from one or more policies in policies 402. In this example embodiment, extracted knowledge 404 can comprise semantic knowledge that corresponds to a feature (e.g., a characteristic and/or an attribute) of a target entity and/or cohort 412. In this example embodiment, extraction component 202 can extract extracted knowledge 404 using one or more ML and/or AI models and/or techniques (e.g., NLP, deep NLP, and/or another model and/or technique), for instance, as described above with reference to the example embodiments depicted in FIGS. 1, 2, and 3. In the example embodiment depicted in FIG. 4, such extracted knowledge 404 can include, but is not limited to, structured data, unstructured data, textual data, alphanumeric data, token data, character data, object data, graph data, rule data, table data, and/or other data.

In the example embodiment illustrated in FIG. 4, similarity component 302 can identify semantically similar data 406 in different policies of policies 402. For example, similarity component 302 can identify first data in a first policy of policies 402 that has a first semantic similarity score within a defined range of a second semantic similarity score of second data in a second policy of policies 402, where the first semantic similarity score and the second semantic similarity score are calculated based on a feature (e.g., a characteristic and/or an attribute) of target entity and/or cohort 412. For instance, similarity component 302 can identify semantically similar data 406 comprising, for example, a characteristic of target entity and/or cohort 412 in a section (e.g., a paragraph) of a first policy of policies 402 that has a first semantic similarity score within a defined range of a second semantic similarity score of the characteristic of target entity and/or cohort 412 in a section (e.g., a paragraph) of a second policy in policies 402, where the first semantic similarity score and the second semantic similarity score are calculated based on the characteristic. To perform this identification operation, similarity component 302 can employ one or more semantic similarity models and/or techniques including, but not limited to, topic modelling, Jaccard similarity, and/or another sematic similarity model and/or technique that can be used to identify semantically similar data with respect to a certain feature of target entity and/or cohort 412.

As illustrated in the example embodiment depicted in FIG. 4, extraction component 202 and similarity component 302 can respectively provide extracted knowledge 404 and semantically similar data 406 to comparison component 108. In this example embodiment, comparison component 108 can further receive (e.g., via a GUI, an API, a REST API, and/or another interface component of policy comparison system 102) domain knowledge 408. In this example embodiment, domain knowledge 408 can include, but is not limited to, ontologies (e.g., ontology information providing defined ontologies used in the domain), knowledge bases (e.g., knowledge graph information defining one or more knowledge graphs used in the domain), terminologies (e.g., dictionary and/or term information defining terms and associated definitions used in the domain), cost of services covered by policies, census data, taxonomies, data models defining relationships between data objects associated with the domain, tables, business rules schemas, and/or other domain knowledge. For example, with respect to the healthcare industry, domain knowledge 408 can include information defining procedure codes, medical terms, information relating data objects associated with specific medical services to one another, and/or other domain knowledge in the healthcare industry.

In the example embodiment illustrated in FIG. 4, based on receiving extracted knowledge 404, semantically similar data 406, and domain knowledge 408, comparison component 108 can contextually compare semantics of conditions in policy data of different policies in policies 402 based on a feature (e.g., a characteristic and/or an attribute) of target entity and/or cohort 412 to generate formalized differences and supporting evidence 410. For example, to generate formalized differences and supporting evidence 410, comparison component 108 can use extracted knowledge 404, semantically similar data 406, and/or domain knowledge 408 to contextually compare semantics of conditions (e.g., eligibility criteria) in first policy data of a first policy in policies 402 against those in second policy data of a second policy in policies 402 based on a feature (e.g., a characteristic and/or an attribute) of target entity and/or cohort 412. In this example embodiment, each of such first and/or second policy data can include, but is not limited to, a section, a paragraph, a sentence, a table, a chart, a graph, a glossary, an appendix, and/or other policy data.

In the example embodiment depicted in FIG. 4, to perform the above described contextual comparison and generate formalized differences and supporting evidence 410 using extracted knowledge 404, semantically similar data 406, and/or domain knowledge 408, comparison component 108 can employ one or more ML and/or AI models and/or techniques as described above with reference to the example embodiments depicted in FIGS. 1, 2, and 3. For example, comparison component 108 can employ a sequence model (e.g., a sequence of words model), a neural network (e.g., a convolutional neural network (CNN), a recurrent neural network (RNN), and/or variations of CNN and/or RNN), an n-gram model, a classification model, a support vector machine (SVM), a logistic regression model, natural language processing (NLP), deep learning, and/or another ML and/or AI model and/or technique.

In the example embodiment illustrated in FIG. 4, to contextually compare semantics of conditions in different policies of policies 402 based on a feature of target entity and/or cohort 412, comparison component 108 can identify similarities and/or differences between similar policy data (e.g., similar policy sections, paragraphs, sentences, and/or other similar policy data) in different policies of policies 402. For example, using extracted knowledge 404, semantically similar data 406, and/or domain knowledge 408, comparison component 108 can compare the rules of semantically similar conditions in a first policy of policies 402 against those in a second policy of policies 402 and can further express the differences (e.g., as formalized differences expressed in a computer readable format, a human readable format, and/or in another type of format). For instance, using extracted knowledge 404, semantically similar data 406, and/or domain knowledge 408, comparison component 108 can employ a knowledge graph comparisons technique to identify similarities and differences between condition rules in first policy data of a first policy in policies 402 and second policy data of a second policy in policies 402. In some embodiments, comparison component 108 of system 400 can use extracted knowledge 404, semantically similar data 406, and/or domain knowledge 408 to semantically compare rules extracted from first policy data (e.g., text in a paragraph) of a first policy in policies 402 against rules extracted from second policy data (e.g., text in a paragraph) of a second policy in policies 402 to identify similarities and differences between condition rules in the first policy and the second policy. In this example, such rules can be extracted by extraction component 202 as described above.

Figure 6:
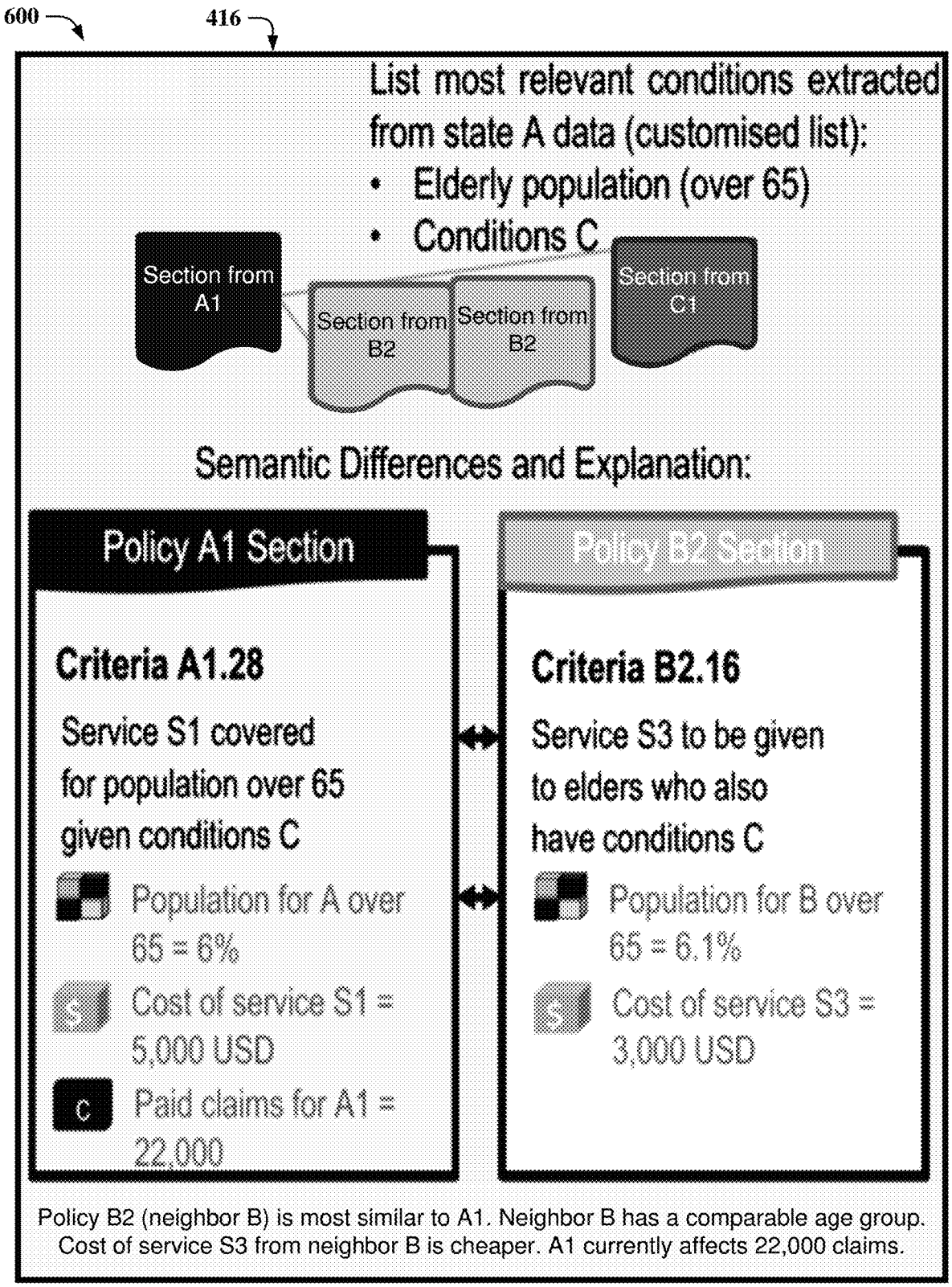
FIG. 6 illustrates an example, non-limiting diagram that can facilitate contextual comparison of semantics in conditions of different policies in accordance with one or more embodiments described herein.

As illustrated in the example embodiment depicted in FIG. 4, comparison component 108 can provide formalized differences and supporting evidence 410 to contextualization component 110. In this example embodiment, contextualization component 110 can further receive (e.g., via a GUI, an API, a REST API, and/or another interface component of policy comparison system 102) domain knowledge 408, data that identifies and/or defines target entity and/or cohort 412, and/or contextual data 414. In various embodiments of the subject disclosure, contextual data 414 can include, but is not limited to: operational data (e.g., policy provider claims); statistical data (e.g., census data and/or other statistical data describing the population of, for instance, a city, a town, a state, or a country); entity profile data; entity preferences data; ADL data; and/or another type of contextual data related to target entity and/or cohort 412. In the example embodiment depicted in FIG. 4, contextualization component 110 can use domain knowledge 408, formalized differences and supporting evidence 410, target entity and/or cohort 412 identification data, and/or contextual data 414 to provide a list of identified differences explained 416 as described below. For clarity, the list of identified differences explained 416 is illustrated in FIG. 6.

In the example embodiment illustrated in FIG. 4, to generate the list of identified differences explained 416 using domain knowledge 408, formalized differences and supporting evidence 410, target entity and/or cohort 412 identification data, and/or contextual data 414, contextualization component 110 can employ a model to provide a contextual explanation of how a first condition (e.g., a first eligibility criterion) in first policy data (e.g., a section and/or a paragraph) of a first policy in policies 402 is semantically different from a second condition in second policy data of a second policy in policies 402 based on a feature (e.g., a characteristic and/or an attribute) of target entity and/or cohort 412. To generate the list of identified differences explained 416 that can comprise such a contextual explanation, contextualization component 110 can employ a model to provide one or more first conditions in first policy data of a first policy in policies 402 that are semantically different from one or more second conditions in second policy data of a second policy in policies 402 based on a feature of target entity and/or cohort 412. For example, to provide one or more first conditions in the first policy data that are semantically different from one or more second conditions in the second policy data based on the feature of target entity and/or cohort 412, contextualization component 110 can determine which feature(s) of target entity and/or cohort 412 and/or which condition(s) in the first and/or second policy data of the first and/or second policies in policies 402 are relevant to target entity and/or cohort 412. To determine such feature(s) and/or condition(s), contextualization component 110 can use one or more preferences of target entity and/or cohort 412. In some embodiments, an entity as defined herein can define such preferences (e.g., relevant feature(s) and/or condition(s)) using, for instance, a GUI, an API, a REST API, and/or another type of interface of policy comparison system 102.

In some embodiments, contextualization component 110 can implement a preference learning process to infer such preferences (e.g., relevant feature(s) and/or condition(s)) corresponding to target entity and/or cohort 412. In these embodiments, contextualization component 110 can implement such a preference learning process to infer such preferences using, for instance, a recommender system (e.g., a recommender model such as, for example, a regression model and/or a classification model). In these embodiments, such a recommender system can be trained to learn the preferences of target entity and/or cohort 412 (e.g., to learn relevant feature(s) and/or condition(s) corresponding to target entity and/or cohort 412) using historical usage pattern data corresponding to target entity and/or cohort 412. For example, such a recommender system can be trained to learn such preferences of target entity and/or cohort 412 using historical usage pattern data including, but not limited to, historical operational data (e.g., policy provider claims), historical policy holder data, historical policy record data, contextual data (e.g., entity profile data, ADL data, census data, and/or other contextual data), and/or other historical usage pattern data corresponding to target entity and/or cohort 412.

In some embodiments, to determine such preferences of target entity and/or cohort 412 and/or to provide the list of identified differences explained 416 comprising the above described contextual explanation, contextualization component 110 can employ an ML and/or AI model and/or technique (e.g., a neural network, a recommender system, an explanatory model, a predictive model, a classifier, and/or another ML and/or AI model and/or technique). In another example, contextualization component 110 can employ one or more preference inference models and/or techniques to determine such preferences of target entity and/or cohort 412 and/or to provide the list of identified differences explained 416 comprising such a contextual explanation. For instance, contextualization component 110 can employ one or more preference inference models and/or techniques including, but not limited to, a lexicographic model, a Pareto chart, and/or another preference inference model and/or technique that can be used to determine such preferences of the target entity and/or cohort 412 and/or to provide the list of identified differences explained 416 comprising such a contextual explanation described above.

In the example embodiment illustrated in FIG. 4, contextualization component 110 can employ a model to provide the list of identified differences explained 416 comprising a contextual explanation of how a first condition in first policy data of a first policy in policies 402 is semantically different from a second condition in second policy data of a second policy in policies 402 based on contextual data 414 corresponding to target entity and/or cohort 412. For example, contextualization component 110 can employ one or more of the above defined models and/or techniques (e.g., a preference inference model and/or technique, a lexicographic model, a Pareto chart, a neural network, a recommender system, an explanatory model, a predictive model, a classifier, and/or another model and/or technique) to determine which contextual data is relevant to target entity and/or cohort 412 and/or to provide the list of identified differences explained 416 comprising such a contextual explanation based on contextual data 414.

In the example embodiment illustrated in FIG. 4, contextualization component 110 can employ a model to rank first conditions in first policy data of a first policy in policies 402 that are semantically different from second conditions in second policy data of a second policy in policies 402 based on relevance to a feature (e.g., a characteristic and/or an attribute) of target entity and/or cohort 412. For example, to rank first conditions in first policy data of a first policy in policies 402 that are semantically different from second conditions in second policy data of a second policy in policies 402 based on relevance to a feature (e.g., a characteristic and/or an attribute) of target entity and/or cohort 412, contextualization component 110 can employ one or more of the above defined models and/or techniques (e.g., a preference inference model and/or technique, a lexicographic model, a Pareto chart, a neural network, a recommender system, an explanatory model, a predictive model, a classifier, and/or another model and/or technique). For instance, contextualization component 110 can implement a preference learning process to infer and further rank first conditions in the first policy data of a first policy in policies 402 that are semantically different from second conditions in the second policy data of a second policy in policies 402 based on relevance to a feature (e.g., a characteristic and/or an attribute) of target entity and/or cohort 412. In this example, contextualization component 110 can implement a preference learning process using, for instance, a recommender system (e.g., a recommender model such as, for example, a regression model and/or a classification model) to rank first conditions in the first policy data of the first policy in policies 402 that are semantically different from second conditions in the second policy data of the second policy in policies 402 based on relevance to a feature (e.g., a characteristic and/or an attribute) of target entity and/or cohort 412. In this example, such a recommender system can be trained to learn such first conditions in the first policy data of the first policy in policies 402 (e.g., to learn conditions in the policy data of a policy in policies 402 that are relevant to target entity and/or cohort 412) using historical usage pattern data corresponding to target entity and/or cohort 412 as described above. In some embodiments, contextualization component 110 can provide the above described ranking of such conditions in the list of identified differences explained 416.

As illustrated in the example embodiment depicted in FIG. 4, contextualization component 110 can provide formalized differences and supporting evidence 410, target entity and/or cohort 412 identification data, contextual data 414, and/or the list of identified differences explained 416 to extraction component 202 and/or similarity component 302. In some embodiments, contextualization component 110 can provide formalized differences and supporting evidence 410, target entity and/or cohort 412 identification data, contextual data 414, and/or the list of identified differences explained 416 to extraction component 202 and/or similarity component 302 to facilitate an active learning process. In some embodiments, such an active learning process can facilitate, for instance: extraction of extracted knowledge 404 from policies 402 by extraction component 202; and/or identification of semantically similar data 406 from policies 402 by similarity component 302.

Figure 5:
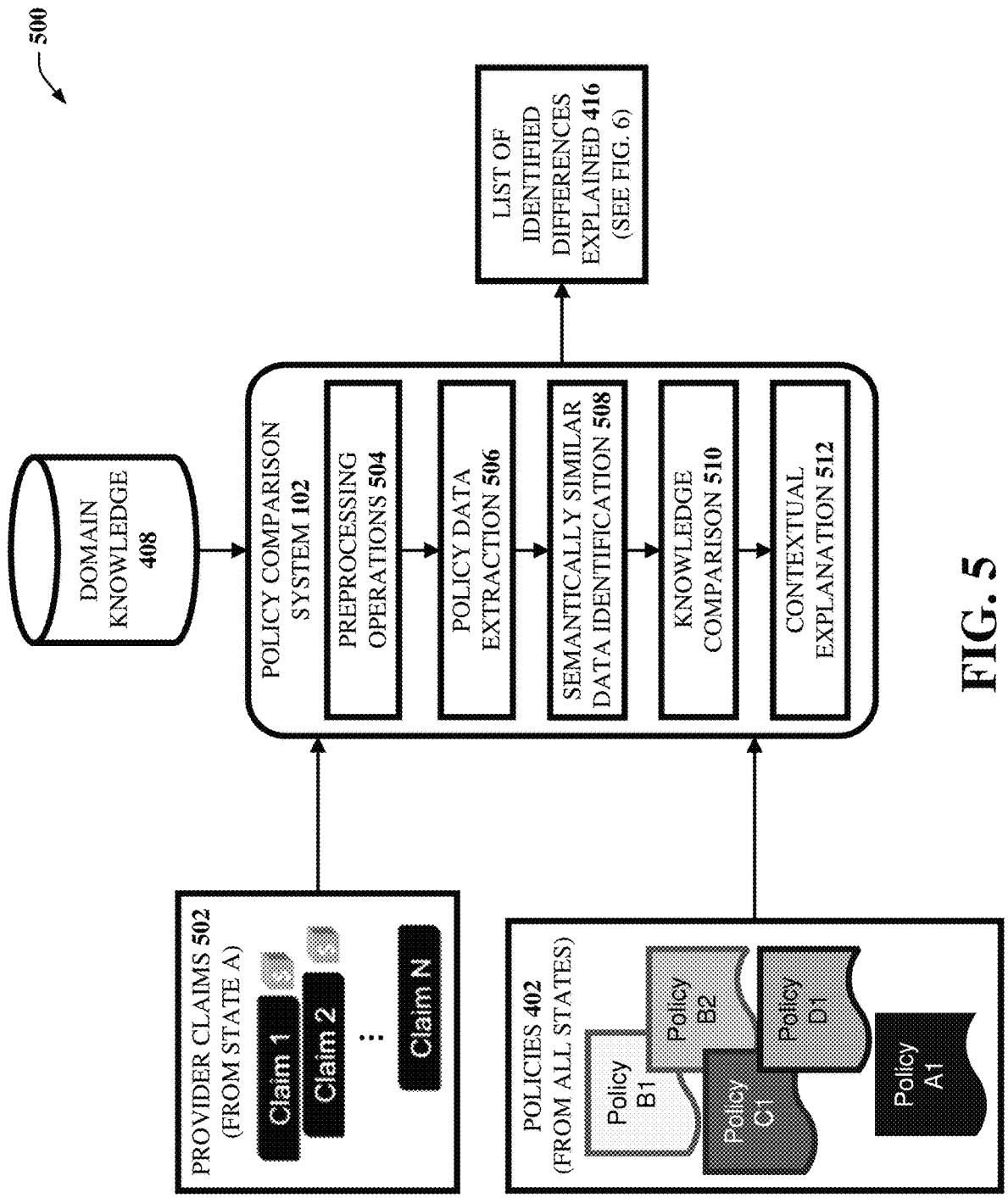

FIG. 5 illustrates a block diagram of an example, non-limiting system 500 that can facilitate contextual comparison of semantics in conditions of different policies in accordance with one or more embodiments described herein. Repetitive description of like elements and/or processes employed in respective embodiments is omitted for sake of brevity.

As illustrated in the example embodiment depicted in FIG. 5, policy comparison system 102 can receive (e.g., via a GUI, an API, a REST API, and/or another interface component of policy comparison system 102) policies 402, domain knowledge 408, and/or provider claims 502. As annotated in the example embodiment illustrated in FIG. 5, policies 402 of system 500 can comprise policies of various states (denoted in FIG. 5 as "Policy A1," "Policy B1," "Policy B2," "Policy C1," and "Policy D1") and provider claims 502 can comprise claims filed by policy holders of a policy from State A (denoted in FIG. 5 as "Claim 1" "Claim 2" and "Claim N," where N denotes a total quantity of claims).

In the example embodiment illustrated in FIG. 5, based on receiving policies 402, domain knowledge 408, and/or provider claims 502, policy comparison system 102 can perform one or more preprocessing operations 504 on one or more of such inputs. For example, policy comparison system 102 can perform preprocessing operations 504 comprising, for instance, extract, transform, and load (ETL) operations on policies 402, domain knowledge 408, and/or provider claims 502.

In the example embodiment illustrated in FIG. 5, based on performing such one or more preprocessing operations 504 on policies 402, domain knowledge 408, and/or provider claims 502, policy comparison system 102 can employ extraction component 202 to perform policy data extraction 506. For example, extraction component 202 can extract knowledge from policies 402 and/or provider claims 502 of system 500 in the same manner as extraction component 202 can extract extracted knowledge 404 from policies 402 of system 400 as described above with reference to the example embodiments illustrated in FIGS. 1, 2, 3, and 4. For instance, extraction component 202 can extract semantic knowledge that corresponds to a feature (e.g., a characteristic and/or an attribute) of target entity and/or cohort 412 from different policies in policies 402 and/or from provider claims 502 of system 500 in the same manner as extraction component 202 can extract extracted knowledge 404 from different policies in policies 402 of system 400 as described above with reference to the example embodiments illustrated in FIGS. 1, 2, 3, and 4.

In the example embodiment illustrated in FIG. 5, based on extraction component 202 performing policy data extraction 506 as described above, policy comparison system 102 can employ similarity component 302 to perform semantically similar data identification 508. For example, similarity component 302 can identify semantically similar data in different policies of policies 402 and/or in provider claims 502 of system 500 in the same manner as similarity component 302 can identify semantically similar data 406 in different policies of policies 402 of system 500 as described above with reference to the example embodiments illustrated in FIGS. 1, 2, 3, and 4. For instance, to perform semantically similar data identification 508, similarity component 302 can identify first data in a first policy of policies 402 and/or a first claim in provider claims 502 that has a first semantic similarity score within a defined range of a second semantic similarity score of second data in a second policy of policies 402 and/or a second claim in provider claims 502, where the first semantic similarity score and the second semantic similarity score are calculated based on a feature (e.g., a characteristic and/or an attribute) of target entity and/or cohort 412.

In the example embodiment illustrated in FIG. 5, based on performing policy data extraction 506 and semantically similar data identification 508, policy comparison system 102 can employ comparison component 108 to perform knowledge comparison 510. In this example embodiment, based on performing policy data extraction 506 and semantically similar data identification 508, extraction component 202 and similarity component 302 can respectively provide to comparison component 108 the semantic knowledge extracted by extraction component 202 and the semantically similar data identified by similarity component 302. In this example embodiment, based on receiving such extracted semantic knowledge and identified semantically similar data, comparison component 108 can contextually compare semantics of conditions in policy data of different policies in policies 402 of system 500 in the same manner as comparison component 108 can contextually compare semantics of conditions in policy data of different policies in policies 402 of system 400 as described above with reference to the example embodiments illustrated in FIGS. 1, 2, 3, and 4. For example, comparison component 108 can use the extracted semantic knowledge provided by extraction component 202, the identified semantically similar data provided by similarity component 302, and domain knowledge 408 to contextually compare semantics of conditions in policy data of different policies in policies 402 based on a feature (e.g., a characteristic and/or an attribute) of target entity and/or cohort 412 to generate formalized differences and supporting evidence 410.

In the example embodiment illustrated in FIG. 5, based on performing knowledge comparison 510, policy comparison system 102 can employ contextualization component 110 to provide contextual explanation 512. For example, contextualization component 110 can provide contextual explanation 512 in the same manner as contextualization component 110 can provide the above described contextual explanation that can be included in the list of identified differences explained 416 as described above with reference to the example embodiment depicted in FIG. 4. For instance, contextualization component 110 can employ one or more of the models and/or techniques defined above with reference to system 400 to provide a contextual explanation of how one or more first conditions (e.g., a first eligibility criterion) in first policy data (e.g., a section and/or a paragraph) of a first policy in policies 402 is semantically different from one or more second conditions in second policy data of a second policy in policies 402 based on a feature (e.g., a characteristic and/or an attribute) of target entity and/or cohort 412 and/or domain knowledge 408.

In the example embodiment illustrated in FIG. 5, based on providing contextual explanation 512, contextualization component 110 can further generate the list of identified differences explained 416, which can comprise contextual explanation 512. In this example embodiment, contextualization component 110 can generate the list of identified differences explained 416 in the same manner as described above with reference to the example embodiment depicted in FIG. 4. For example, contextualization component 110 can employ one or more models and/or techniques defined above with reference to system 400 to rank first conditions in first policy data of a first policy in policies 402 that are semantically different from second conditions in second policy data of a second policy in policies 402 based on relevance to a feature (e.g., a characteristic and/or an attribute) of target entity and/or cohort 412. In example embodiment depicted in FIG. 5, contextualization component 110 can provide the above described ranking of such conditions in the list of identified differences explained 416. In this example embodiment, policy comparison system 102 and/or contextualization component 110 can provide (e.g., via a GUI, an API, a REST API, and/or another interface component of policy comparison system 102) the list of identified differences explained 416 to an entity as defined herein that implements policy comparison system 102.

FIG. 6 illustrates an example, non-limiting diagram 600 that can facilitate contextual comparison of semantics in conditions of different policies in accordance with one or more embodiments described herein. Repetitive description of like elements and/or processes employed in respective embodiments is omitted for sake of brevity.

Diagram 600 can comprise an example, non-limiting embodiment of the list of identified differences explained 416 described above with reference to the example embodiments illustrated in FIGS. 4 and 5. As illustrated in the example embodiment depicted in FIG. 6, the list of identified differences explained 416 can comprise a list of the most relevant conditions extracted from certain policy data of a certain policy. In some embodiments, such a list of the most relevant conditions can be ranked (e.g., by contextualization component 110) as described above with reference to the example embodiments illustrated in FIGS. 1, 2, 3, 4, and 5. As illustrated in the example embodiment depicted in FIG. 6, the list of identified differences explained 416 can further comprise semantic differences between policy data in different policies and an explanation of such differences.

Figure 7:
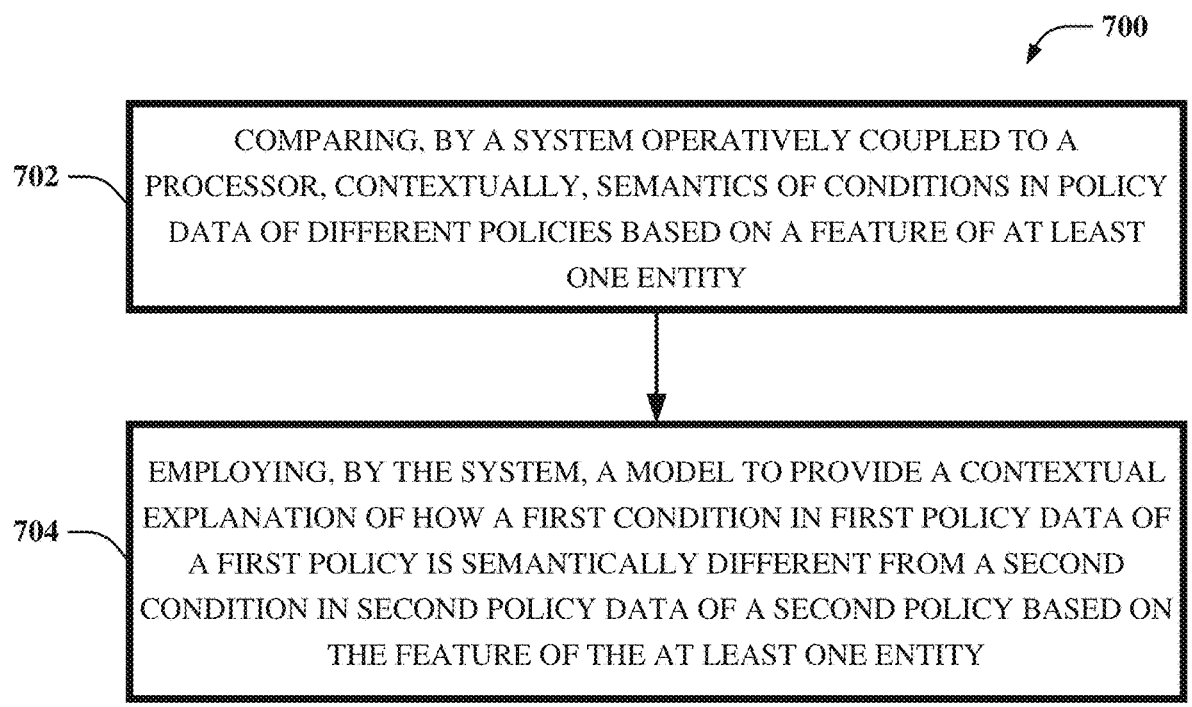
FIG. 7 illustrates a flow diagram of an example, non-limiting computer-implemented method that can facilitate contextual comparison of semantics in conditions of different policies in accordance with one or more embodiments described herein.

FIG. 7 illustrates a flow diagram of an example, non-limiting computer-implemented method 700 that can facilitate contextual comparison of semantics in conditions of different policies in accordance with one or more embodiments described herein. Repetitive description of like elements and/or processes employed in respective embodiments is omitted for sake of brevity.

At 702, computer-implemented method 700 can comprise comparing, by a system (e.g., via policy comparison system 102 and/or comparison component 108) operatively coupled to a processor (e.g., processor 106), contextually, semantics of conditions in policy data of different policies based on a feature of at least one entity.

At 704, computer-implemented method 700 can comprise employing, by the system (e.g., via policy comparison system 102 and/or contextualization component 110), a model to provide a contextual explanation of how a first condition in first policy data of a first policy is semantically different from a second condition in second policy data of a second policy based on the feature of the at least one entity.

Policy comparison system 102 can be associated with various technologies. For example, policy comparison system 102 can be associated with data comparison technologies, policy comparison technologies, ML and/or AI model technologies, cloud computing technologies, and/or other technologies.

Policy comparison system 102 can provide technical improvements to systems, devices, components, operational steps, and/or processing steps associated with the various technologies identified above. For example, policy comparison system 102 can contextually compare semantics of conditions in policy data of different policies based on a feature of at least one entity; and/or employ a model to provide a contextual explanation of how a first condition in first policy data of a first policy is semantically different from a second condition in second policy data of a second policy based on the feature of the at least one entity. In this example, by contextually comparing semantics of conditions in policy data of different policies based on a feature of an entity and/or a cohort and further providing such a contextual explanation of how the conditions in the policies are semantically different based on such a feature, policy comparison system 102 can thereby reduce a workload (e.g., a processing workload) and/or execution time of a model and/or a processor employed to compare the first policy data and/or the first policy to the second policy data and/or the second policy, respectively.

Policy comparison system 102 can provide technical improvements to a processing unit associated with policy comparison system 102. For example, as described above, by contextually comparing semantics of conditions in policy data of different policies based on a feature of an entity and/or a cohort and further providing a contextual explanation of how the conditions in the policies are semantically different based on such a feature, policy comparison system 102 can thereby reduce a workload (e.g., a processing workload) and/or execution time of a model and/or a processor employed to compare the first policy data and/or the first policy to the second policy data and/or the second policy, respectively. In this example, by reducing a workload (e.g., a processing workload) and/or execution time of a processor (e.g., processor 106) employed to compare the first policy data and/or the first policy to the second policy data and/or the second policy, respectively, policy comparison system 102 can thereby improve the performance and/or efficiency of such a processor (e.g., processor 106) and/or reduce the computational costs of the processor.

A practical application of policy comparison system 102 is that it can be implemented in one or more domains to enable contextual comparison of semantically similar data in different policies based on one or more features (e.g., characteristic and/or attribute) of a certain entity and/or a certain cohort. For example, a practical application of policy comparison system 102 is that it can be implemented in, for instance, the medical insurance domain to enable contextual comparison of semantically similar claim eligibility conditions (e.g., criteria) in different medical insurance policies based on one or more features (e.g., age, location of residence, pre-existing condition, and/or another feature) of a certain entity and/or a certain cohort.

It should be appreciated that policy comparison system 102 provides a new approach driven by relatively new data comparison technologies. For example, policy comparison system 102 provides a new approach to automatically compare, contextually, semantics of conditions in policy data of different policies based on a feature of an entity and/or a cohort and further provide a contextual explanation of how the conditions in the policies are semantically different based on such a feature.

Policy comparison system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. Policy comparison system 102 and/or components thereof, can be employed to solve new problems that arise through advancements in technologies mentioned above, employment of quantum computing systems, cloud computing systems, computer architecture, and/or another technology.

It is to be appreciated that policy comparison system 102 can utilize various combinations of electrical components, mechanical components, and circuitry that cannot be replicated in the mind of a human or performed by a human, as the various operations that can be executed by policy comparison system 102 and/or components thereof as described herein are operations that are greater than the capability of a human mind. For instance, the amount of data processed, the speed of processing such data, or the types of data processed by policy comparison system 102 over a certain period of time can be greater, faster, or different than the amount, speed, or data type that can be processed by a human mind over the same period of time.

According to several embodiments, policy comparison system 102 can also be fully operational towards performing one or more other functions (e.g., fully powered on, fully executed, and/or another function) while also performing the various operations described herein. It should be appreciated that such simultaneous multi-operational execution is beyond the capability of a human mind. It should also be appreciated that policy comparison system 102 can include information that is impossible to obtain manually by an entity, such as a human user. For example, the type, amount, and/or variety of information included in policy comparison system 102, comparison component 108, contextualization component 110, extraction component 202, and/or similarity component 302 can be more complex than information obtained manually by an entity, such as a human user.

In some embodiments, policy comparison system 102 can be associated with a cloud computing environment. For example, policy comparison system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Policy comparison system 102 and/or components thereof (e.g., comparison component 108, contextualization component 110, extraction component 202, similarity component 302, and/or another component) can employ one or more computing resources of cloud computing environment 950 described below with reference to FIG. 9 and/or one or more functional abstraction layers described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, and/or another classical computing device), quantum hardware, and/or quantum software (e.g., quantum computing device, quantum computer, quantum processor, quantum circuit simulation software, superconducting circuit, and/or other quantum hardware and/or quantum software) that can be employed by policy comparison system 102 and/or components thereof to execute one or more operations in accordance with one or more embodiments of the subject disclosure described herein. For instance, policy comparison system 102 and/or components thereof can employ such one or more classical and/or quantum computing resources to execute one or more classical and/or quantum: mathematical function, calculation, and/or equation; computing and/or processing script, processing thread, and/or instruction; algorithm; model (e.g., AI model, ML model, and/or another type of model); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
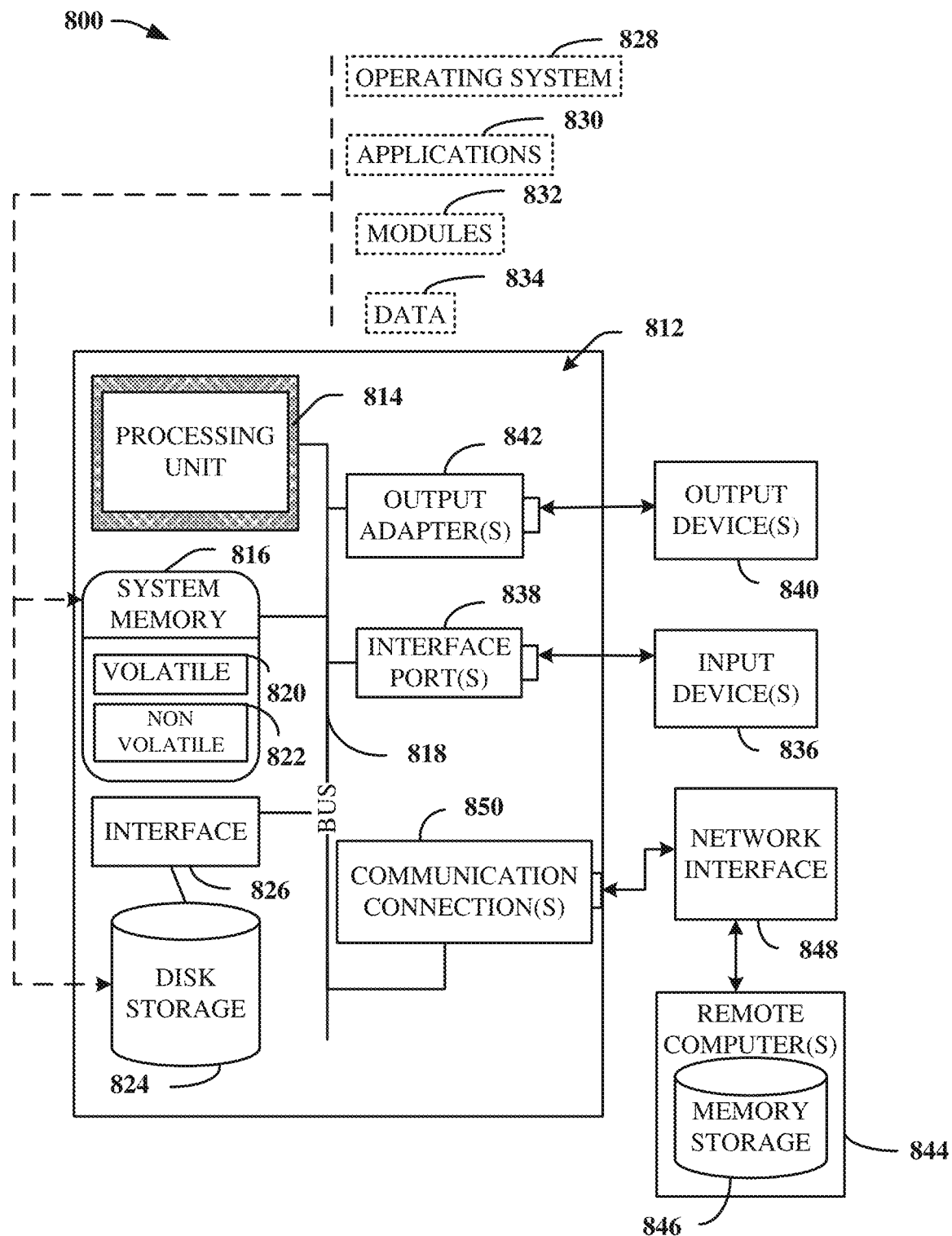
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
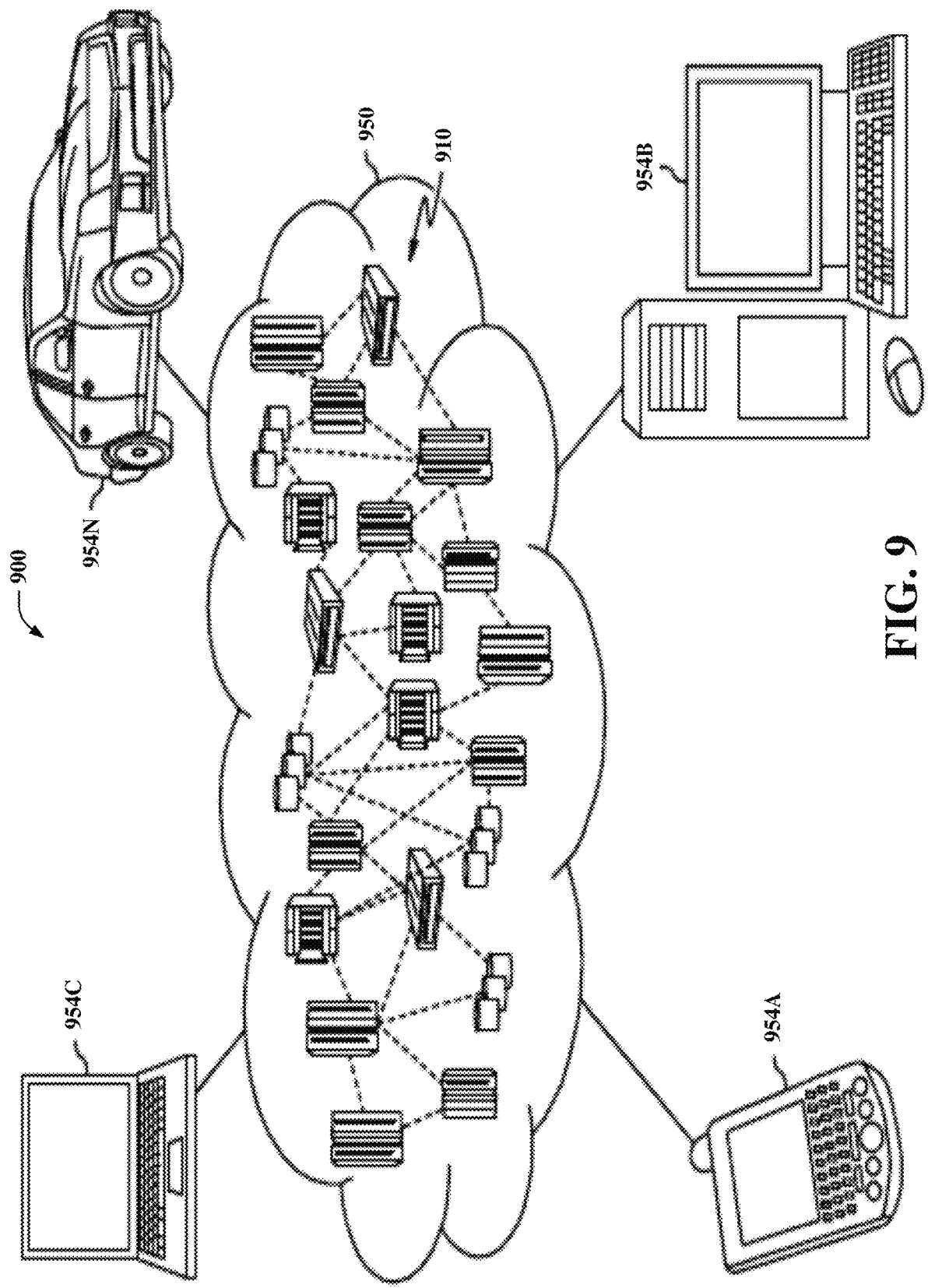
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, and/or another quantum platform) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
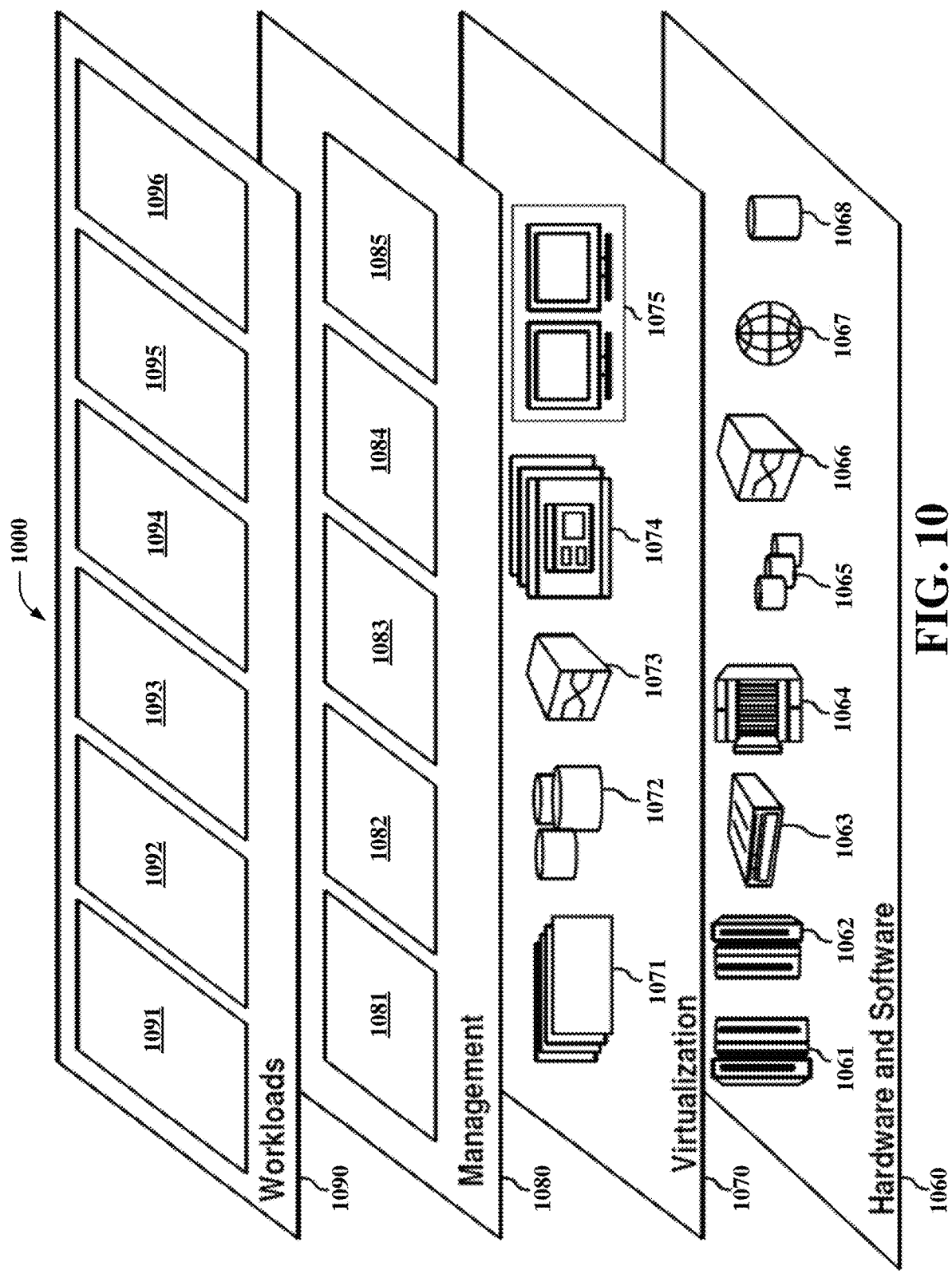
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, quantum platform routing software (not illustrated in FIG. 10), and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and policy comparison software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, handheld computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a processor that executes computer executable components stored in memory, the computer executable components comprising:
        an extraction component that generates, via artificial intelligence that employs natural language processing, training data comprising historical usage pattern data based on extracted data associated with entities from policy data from different government policies, and based on domain knowledge of a governmental domain associated with the different policies, wherein the historical usage pattern data comprises at least one of historical claims data, historical policy holder data, or contextual data;
        a comparison component that trains, using the training data, a neural network model to contextually compare semantics of conditions in the policy data of the different government policies based on features of the entities and the historical usage pattern data, and generate contextual explanations of how respective conditions in two different policies of the different policies are semantically different; and
        a contextualization component that employs the neural network model to provide to an entity of the entities a contextual explanation of how a first condition in first policy data of a first government policy of the different government policies is semantically different from a second condition in second policy data of a second government policy of the different government policies based on a feature of the entity.

2. The system of claim 1, wherein the extraction component extracts, using the neural network model, first data from the first policy data and second data from the second policy data, and wherein the first data and second data correspond to the feature of the entity.

3. The system of claim 1, wherein the computer executable components further comprise:
    a similarity component that identifies, using the neural network model, first data in the first policy data that has a first semantic similarity score within a defined range of a second semantic similarity score of second data in the second policy data, and wherein the first semantic similarity score and the second semantic similarity score are calculated based on the feature of the entity.

4. The system of claim 1, wherein the neural network model further contextually compares the semantics of the conditions in the policy data based on at least one of: the domain knowledge corresponding to the first policy data or the second policy data; first data in the first policy data that has a first semantic similarity score within a defined range of a second semantic similarity score of second data in the second policy data; or the first data extracted from the first policy data and the second data extracted from the second policy data.

5. The system of claim 1, wherein the contextualization component further employs the neural network model to provide the contextual explanation of how the first condition in the first policy data is semantically different from the second condition in the second policy data based on contextual data corresponding to the entity and to reduce at least one of: workload or execution time of the model or the processor in comparing the first policy data and the second policy data.

6. The system of claim 1, wherein the contextualization component further employs the neural network model to provide one or more first conditions in the first policy data that are semantically different from one or more second conditions in the second policy data based on the feature of the entity.

7. The system of claim 1, wherein the contextualization component further employs the neural network model to rank first conditions in the first policy data that are semantically different from second conditions in the second policy data based on relevance to at least one of the entity or the feature of the entity.

8. A computer-implemented method, comprising:
generating, by a system operatively coupled to a processor, via artificial intelligence that employs natural language processing, training data comprising historical usage pattern data based on extracted data associated with entities from policy data from different service provider policies, and based on domain knowledge of a service provider domain associated with the different policies, wherein the historical usage pattern data comprises at least one of historical claims data, historical policy holder data, or contextual data;
training, by the system, using the training data, a machine learning model to compare contextually, semantics of conditions in the policy data of the different service provider policies based on features of the entities and the historical usage pattern data, and generate contextual explanations of how respective conditions in two different policies of the different policies are semantically different; and
employing, by the system, the machine learning model to provide to an entity of the entities a contextual explanation of how a first condition in first policy data of a first service provider policy of the different service provider policies is semantically different from a second condition in second policy data of a second service provider policy of the different service provider policies based on a feature of the entity.

9. The computer-implemented method of claim 8, further comprising:
extracting, by the system, using the machine learning model, first data from the first policy data and second data from the second policy data, wherein the first data and second data correspond to the feature of the entity.

10. The computer-implemented method of claim 8, further comprising:
identifying, by the system, using the machine learning model, first data in the first policy data that has a first semantic similarity score within a defined range of a second semantic similarity score of second data in the second policy data, wherein the first semantic similarity score and the second semantic similarity score are calculated based on the feature of the entity.

11. The computer-implemented method of claim 8, further comprising:
comparing, by the system, using the machine learning model, contextually, the semantics of the conditions in the policy data based on at least one of: the domain knowledge corresponding to the first policy data or the second policy data; first data in the first policy data that has a first semantic similarity score within a defined range of a second semantic similarity score of second data in the second policy data; or the first data extracted from the first policy data and the second data extracted from the second policy data.

12. The computer-implemented method of claim 8, further comprising:
employing, by the system, the machine learning model to provide the contextual explanation of how the first condition in the first policy data is semantically different from the second condition in the second policy data based on contextual data corresponding to the entity and to reduce at least one of: workload or execution time of the model or the processor in comparing the first policy data and the second policy data.

13. The computer-implemented method of claim 8, further comprising:
employing, by the system, the machine learning model to provide one or more first conditions in the first policy data that are semantically different from one or more second conditions in the second policy data based on the feature of the entity.

14. The computer-implemented method of claim 8, further comprising:
employing, by the system, the machine learning model to rank first conditions in the first policy data that are semantically different from second conditions in the second policy data based on relevance to at least one of the entity or the feature of the entity.

15. A computer program product comprising a computer readable storage medium having program instructions embodied therewith, the program instructions executable by a processor to cause the processor to:
generates, via machine learning that employs natural language processing, training data comprising historical usage pattern data based on extracted data associated with entities from policy data from different insurance policies, and based on domain knowledge of an insurance domain associated with the different policies, wherein the historical usage pattern data comprises at least one of historical claims data, historical policy holder data, or contextual data;
train, using the training data, an artificial intelligence model to contextually compare semantics of conditions in policy data of the different insurance policies based on features of the entities and the historical usage pattern data, and generate contextual explanations of how respective conditions in two different policies of the different policies are semantically different; and
employ the artificial intelligence model to provide to an entity of the entities a contextual explanation of how a first condition in first policy data of a first insurance policy of the different insurance policies is semantically different from a second condition in second policy data of a second insurance policy of the different insurance policies based on a feature of the entity.

16. The computer program product of claim 15, wherein the program instructions are further executable by the processor to cause the processor to:
extract, using the artificial intelligence model, first data from the first policy data and second data from the second policy data, and wherein the first data and second data correspond to the feature of the entity.

17. The computer program product of claim 15, wherein the program instructions are further executable by the processor to cause the processor to:
identify, using the artificial intelligence model, first data in the first policy data that has a first semantic similarity score within a defined range of a second semantic similarity score of second data in the second policy data, and wherein the first semantic similarity score and the second semantic similarity score are calculated based on the feature of the entity.

18. The computer program product of claim 15, wherein the program instructions are further executable by the processor to cause the processor to:

contextually compare, using the artificial intelligence model, the semantics of the conditions in the policy data based on at least one of: the domain knowledge corresponding to the first policy data or the second policy data; first data in the first policy data that has a first semantic similarity score within a defined range of a second semantic similarity score of second data in the second policy data; or the first data extracted from the first policy data and the second data extracted from the second policy data.

19. The computer program product of claim 15, wherein the program instructions are further executable by the processor to cause the processor to:

employ the artificial intelligence model to provide the contextual explanation of how the first condition in the first policy data is semantically different from the second condition in the second policy data based on contextual data corresponding to the entity and to reduce at least one of: workload or execution time of the model or the processor in comparing the first policy data and the second policy data.

20. The computer program product of claim 15, wherein the program instructions are further executable by the processor to cause the processor to:

employ the artificial intelligence model to provide one or more first conditions in the first policy data that are semantically different from one or more second conditions in the second policy data based on the feature of the entity; and employ the artificial intelligence model to rank first conditions in the first policy data that are semantically different from second conditions in the second policy data based on relevance to at least one of: the feature of the entity or the entity.

* * * * *